March 28, 1967 E. LEGLER 3,311,702

APPARATUS FOR SYNCHRONIZING A TELEVISION PICTURE SIGNAL SOURCE

Filed Nov. 12, 1963 2 Sheets-Sheet 1

Jnventor:
Ernst Legler
by
Michael J. Striker
Attorney

March 28, 1967 E. LEGLER 3,311,702

APPARATUS FOR SYNCHRONIZING A TELEVISION PICTURE SIGNAL SOURCE

Filed Nov. 12, 1963 2 Sheets-Sheet 2

Jnventor:
Ernst Legler
by Michael J. Striker
Attorney

United States Patent Office 3,311,702

Patented Mar. 28, 1967

3,311,702

APPARATUS FOR SYNCHRONIZING A TELEVISION PICTURE SIGNAL SOURCE

Ernst Legler, Darmstadt, Germany, assignor to Fernseh G.m.b.H., Darmstadt, Germany Filed Nov. 12, 1963, Ser. No. 322,630
Claims priority, application Germany, Nov. 13, 1962, F 38,296
6 Claims. (Cl. 178—69.5)

This invention relates to apparatus for synchronizing a television picture signal source disposed at a remote position with a master pulse generator situated at a central position. More specifically, the present invention is concerned with an apparatus for synchronizing a picture signal source with a master pulse generator operating at an exactly predetermined frequency, for example, a crystal controlled pulse generator with an accuracy adequate for precision-offset operation.

Known synchronizing arrangements in which the operating frequency of a main pulse generator is varied to ensure synchronism cannot be employed in such applications.

It is a broad object of the present invention to provide an apparatus by means of which a television picture signal source operating at a remote position may be synchronized with a master pulse generator situated at a central position with an accuracy adequate for precision-offset operation and for color television.

It is a further object of the present invention to provide a novel apparatus by means of which a picture signal source may be synchronized with a master pulse generator having a high constancy of the repetition rate of the horizontal synchronizing signals, for example a pulse generator with a frequency variation not exceeding $\pm 5 \times 10^{-6}$ c./s.

It is still a further object of the present invention to provide an apparatus correcting the differences in signal transmission times from one or more different remote positions to the central position.

According to the present invention there is provided a remote sync pulse generating equipment situated at a remote position for synchronizing a television picture signal source and a central sync pulse generating equipment with a master pulse generator operating at an exactly predetermined frequency and situated at a central position. Trains of horizontal sync pulses developed respectively by said remote sync pulse generating equipment and by said central sync pulse generating equipment are compared in phase to derive a control voltage which is applied to a phase shifting device arranged to vary the phase of a reference signal transmitted from said central position to said remote position where it is applied to control the operation of said remote sync pulse generating equipment in such a manner as to reduce any discrepancy in phase between said trains of horizontal sync pulses.

Apparatus according to the invention is characterized by great reliability in operation and by only a negligible expense on additional apparatus being required.

Figure 1:
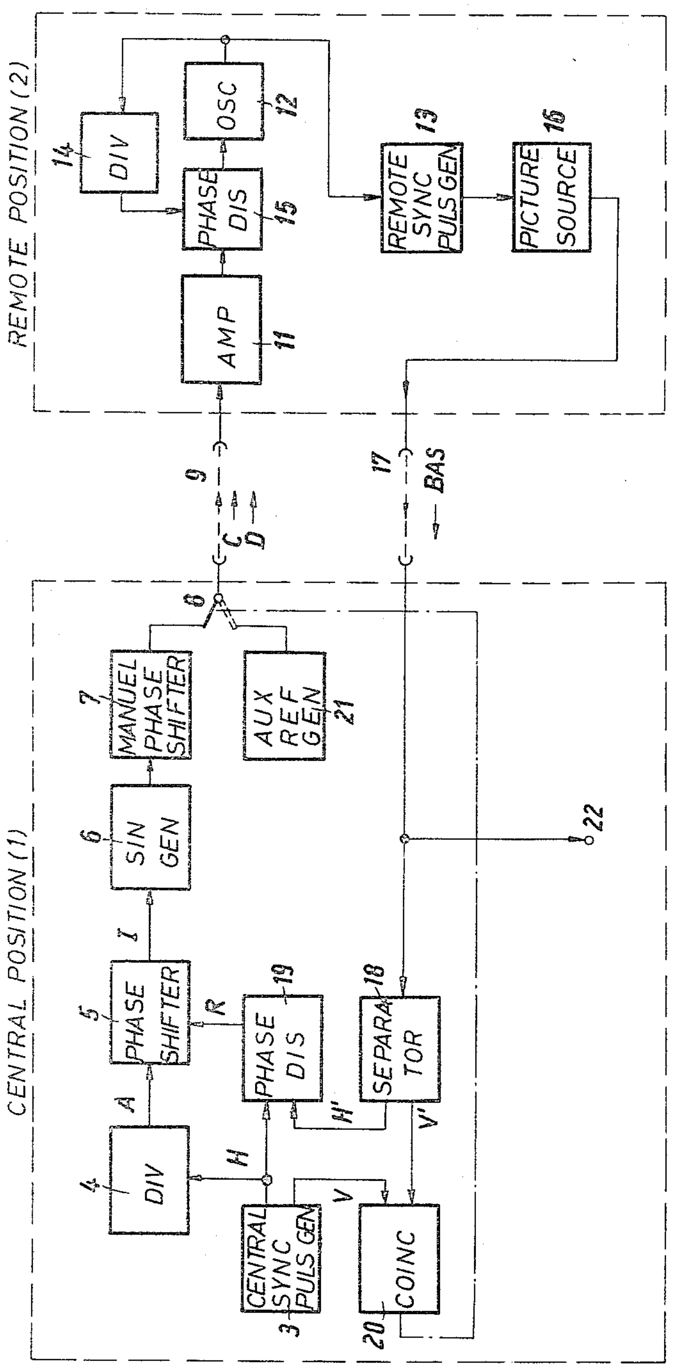
Figure 2:
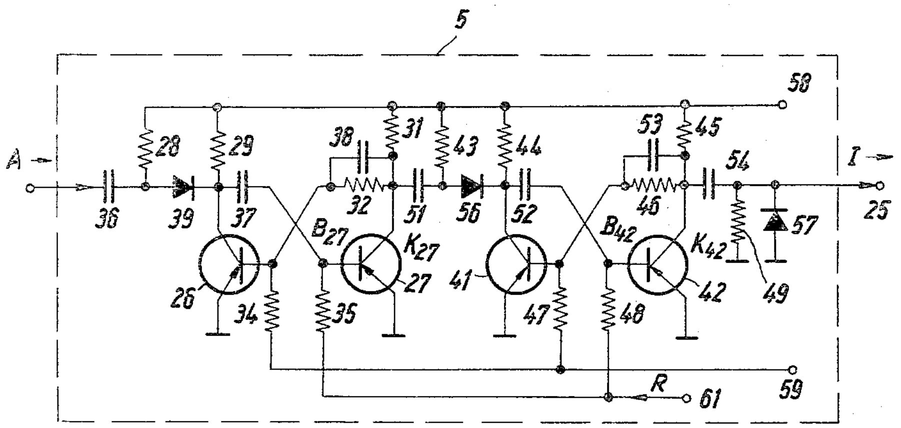

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIGURE 1 is a block schematic diagram of apparatus according to the invention for synchronizing a television signal source situated at a remote position with a master pulse generator at a central position, FIGURE 2 is a circuit diagram of one section of the apparatus described in relation to FIGURE 1, and FIGURE 3 comprises waveform diagrams illustrating the operation of the apparatus described with reference to FIGURE 2.

In all these drawings corresponding elements are designated by the same reference symbols.

The apparatus to be described with reference to FIGURE 1 is assumed to be situated in part at a central position, denoted by a broken line 1, and in part at a remote position denoted by a broken line 2. The central sync pulse generating equipment 3 producing both horizontal-frequency pulses H and vertical-frequency pulses V includes a crystal-controlled master pulse generator. The horizontal-frequency pulses H are applied to a frequency divider 4, which may for example have a frequency division ratio of 2:1 so that it yields as output a pulse train having a repetition rate equal to half the horizontal frequency. This train is applied to an electrically controlled phase-shifting device 5, from the output of which a pulse train having the same repetition rate as the input signal, but a phase which differs from that of the input signal in accordance with the magnitude of an applied control voltage is applied to a device 6 in which there is produced a sinusoidal signal of half the horizontal frequency. The sinusoidal signal produced by device 6 is applied to a manually adjustable phase shifting device 7, the output from which passes by way of a switch 8, the purpose of which is described later, and a cable 9 to the remote position 2. It may in some cases be found that the bandwidth of the signal channel to the remote position is insufficient to transmit at useful amplitude a signal having a frequency equal to half the horizontal frequency. In such cases a lower-frequency signal may be transmitted by appropriately increasing the division ratio of device 4 and the internal arrangements of device 6.

At the remote position 2 the sinusoidal reference signal received over cable 9 from the central position 1 is applied to control an oscillator operating at twice the horizontal frequency which provides the master signal for an auxiliary pulse generator. For this purpose the known "flywheel" control arrangement is preferably employed, the received sinusoidal signal being applied to a selective amplifier 11, the output from which is applied to a phase comparator 15 in which it is compared in phase with a signal derived from a frequency divider 14. Frequency divider 14 has applied to it the output signal from an auxiliary master oscillator 12 and has a division ratio such as to derive from this signal a further signal having a frequency equal to that of the received reference signal. When as is usual the auxiliary master oscillator has a frequency equal to twice the horizontal frequency and the reference signal has a frequency equal to half the horizontal frequency the frequency divider 14 will have a frequency division ratio 1:4. The phase comparator 15 compares the phases of the signal received from the selective amplifier 11 and from the frequency divider 14 and develops as a result of this comparison a control voltage which is applied to control the frequency of oscillator 12 so as to keep the phases of the compared signals in a constant relation. The output from remote master oscillator 12 is also applied to remote sync pulse generating equipment 13 in which are produced all the pulse trains necessary for the operation of a television picture source 16, among which are included horizontal synchronizing pulses H' and vertical synchronizing pulses V', together with a composite synchronizing signal S'. The television picture signal source 16 may be a television camera, a film scanner, a slide scanner or a magnetic recording equipment.

The video signal BAS developed in the remote television signal source 16 is transmitted by way of a cable 17 to the central position 1. For the purposes of the present invention the signal received at the central position from the remote position is applied to a synchronizing separator stage 18 in which the composite synchronizing signal is separated from the picture signal and further separated into individual trains of horizontal and of vertical frequency pulses, H' and V' respectively. The horizontal-frequency synchronizing pulses H' are applied to a phase comparator stage 19, to which also are applied the horizontal-frequency synchronizing pulses H from the central sync pulse generating equipment 3. By comparing the phases of these two trains of horizontal sync pulses phase comparator 19 develops a control voltage R dependent upon the amount of phase difference between the compared signals, which is applied to control the amount of phase shift produced by phase shifter 5, in such a manner that the compared trains of horizontal synchronizing pulses are maintained in synchronism.

In practice a high degree of accuracy is required for the phase synchronism of these horizontal synchronizing pulses H and H' (for example not worse than 0.25%) which is more easily attained if the range of the automatic phase-control system is restricted. For this reason it is usually advantageous to connect a manually adjustable phase shifter 7 in series with the automatic phase shifter 5. When the distance from the central position to the remote position is constant, then this manual control is adjusted once only, so that the automatic phase regulator operates in the centre of the control range.

The phase synchronism of the central vertical sync pulses V (from the central sync pulse equipment 3) and those (V') from the remote sync pulse generating equipment 13 is effected by making use of a coincidence stage 20 which controls the operation of switch 8 already referred to. At any time when the two sets of vertical sync pulses V and V' are not in exact synchronism switch 8 is operated so as to connect an auxiliary oscillator 21 to cable 9 in place of manual phase shifter 7. The phase-controlled signals from sinewave generator 6 are thus replaced in cable 9 by signals from auxiliary oscillator 21 producing a signal D of which the frequency differs by some ±1% from the frequency of the reference signal C. As soon as phase synchronism between the two sets of vertical sync pulses is obtained the coincidence stage 20 provides an output which operates switch 8 to the position shown in full line so that the sinusoidal signal from stage 6 is again applied to the cable 9 for transmission to the remote position.

This phase synchronization of the vertical sync pulses V and V' is carried out once, for example on switching on the apparatus at the remote position 2, but at the latest immediately before fading-in at the central position the video signal transmitted by way of cable 17 from the remote to the control position. To carry out the process of fading-in to the programme at the central position the signal derived from the remote position, this signal is fed by way of a terminal 22 to a vision mixer device (not shown) of conventional construction.

The remote position 2 may in practice be considered as being a remote television studio or a television outside broadcast van, so that the cables 9 and 17 may be considered as being in the first case a telephone line or a broadcast audio channel and in the second case a television cable link. On the other hand the reference signal and the video signal may also be transmitted between the central and the remote positions by means of appropriate radio links. It is also possible for the system to include more than one remote position. Each such remote position must then comprise apparatus such as the units 11–16 described in relation to FIGURE 1 and at the central position there must be provided for each remote position the stages 4–7 and 18–21, together with separate switches 8 and connecting circuits 9, 17, so that the difference in signal transmission times from the different remote positions to the central position may be corrected. In this manner all the video signals received at the central position from the remote positions are brought into phase synchronism (as described in relation to FIGURE 1) and may be applied to a vision mixer by means of which in general one only but sometimes a plurality of such video signals may be faded into the transmission channel leading to the transmitter (not shown).

FIGURE 2 shows a circuit arrangement which may conveniently be employed as the phase-shifter 5 of FIGURE 1. This arrangement consists of two monostable multivibrators connected in cascade. Each of these multivibrators produces a train of rectangular pulses of adjustable duration, each pulse of which is initiated by the trailing edge of an applied trigger pulse.

The first multivibrator consists of transistors 26, 27 of which the emitters are earthed, while their collectors are returned to the negative supply line by way of respective load resistors 29, 31. The collector of transistor 26 is coupled to the base of transistor 27 by way of a capacitor 37, while the collector of transistor 27 is coupled to the base of transistor 26 by way of the parallel combination of a resistor 32 and a capacitor 38, thus providing a known monostable configuration. The base of transistor 26 is returned by way of a resistor 34 to a bias source represented by terminal 59, while to the base of transistor 27 there is applied by way of terminal 61 and a resistor 35 a control voltage which is variable over a given range.

The half-line frequency square wave signal A (see FIGURE 3) received from the frequency divider 4 of FIGURE 1 is applied by way of a capacitor 36 and a resistor 28 to the anode of a diode 39, which passes only the positive-going differentiated spikes to the collector of transistor 26 and thence by way of capacitor 37 to the base of transistor 27, which is thus cut off. The negative-going change in potential which thus arises at the collector of transistor 27 is applied to the base of transistor 26, which is thus caused to pass current, so that there appears at its collector a negative-going change in potential which is applied to the base of transistor 27 by way of capacitor 37. The base potential of transistor 27 is thus held positive until the charge on capacitor 37 has leaked away through resistor 35 sufficiently to allow transistor 27 again to pass current. The onset of current in transistor 27 gives rise to a positive-going change in potential at its collector which is passed to the base of transistor 26 to initiate the reverse trigger action which restores the initial condition of the circuit with transistor 26 passing current and transistor 27 cut off. The duration of the negative-going output pulse which appears at the collector of transistor 27 during the time in which this transistor is cut off is determined by the value of the control potential applied by way of terminal 61 to the foot of the base resistor 35, since it is this potential which determines the rate of discharge of capacitor 37. The width of the output pulse may thus be varied by changing the bias potential applied to terminal 61.

The output pulse appearing at the collector of transistor 27 as described above is differentiated by a capacitor 51 and a resistor 43 connected in series between the collector and the negative line. The positive-going spike resulting from the trailing edge of the pulse is applied by way of a diode 56 to the collector of a transistor 41 and thence by way of a coupling capacitor 52 to the base of a further transistor 42. The emitters of these two transistors are earthed and the collectors are returned to the negative supply line by way of respective load resistors 44, 45. The collector of transistor 41 is coupled to the base of transistor 42 by way of the capacitor 52 already mentioned, while the collector of transistor 42 is coupled to the base of transistor 41 by way of the parallel combination of a resistor 45 and a capacitor 53 to yield the same monostable configuration as for transistors 26, 27. The base of transistor 41 is returned by way of a resistor 47 to the bias source 58, while the base of transistor 42 is returned by way of a resistor 48 to the control bias terminal 61. There thus arises at the collector of transistor 42 a negative-going pulse commencing coincidentally with the trailing edge of the pulse from the first stage and having a duration determined by the control potential applied to terminal 61.

This pulse is applied by way of a differentiating circuit comprising a capacitor 54 and a resistor 49 to a diode 57 which suppresses the negative-going spikes, thus yielding at an output terminal 25 a train of negative-going spikes which are delayed with respect to the positive-going edges of the initial signal A by the sum of the widths of the pulses produced by the multivibrators 26, 27 and 41, 42.

Figure 3:
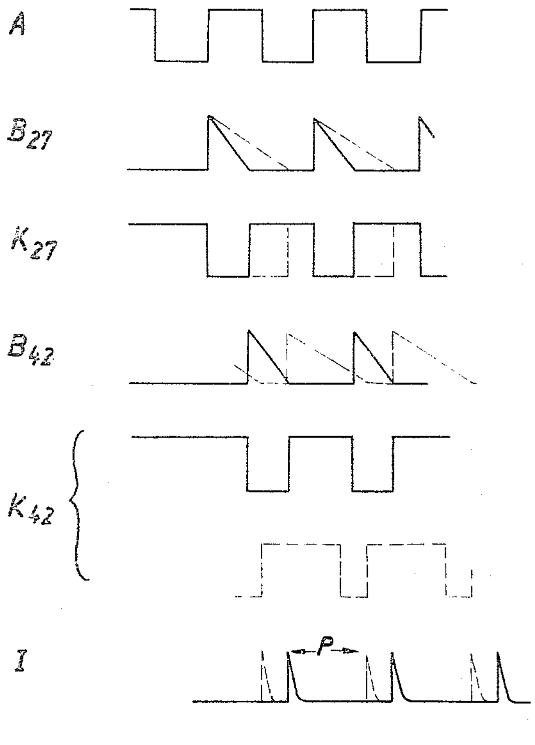

FIGURE 3 shows a series of voltage waveforms which arise at the correspondingly designated positions in the circuit of FIGURE 2. These waveforms illustrate two extreme conditions of operation of the circuit, a first condition for which the waveforms are shown in full line yields a shorter delay and a second condition for which the waveforms are shown in broken line yields a longer delay.

Waveform A illustrates the square-wave signal applied to the input of the phase-shifting circuit, waveform B27 illustrates the waveform arising at the base of transistor 27 when a higher and a lower negative potential are applied to control terminal 61, and waveform K27 illustrates the corresponding pulse waveforms arising at the collector of transistor 27. Waveform B42 illustrates the alternative voltage waveforms arising at the base of transistor 42 and waveform K42 the corresponding alternative pulse signals arising at the collector of transistor 42. Finally waveform I illustrates the alternative output signals appearing at output terminal 25 when the control voltage R has its respective minimum and maximum values of −7 and −3 volts, yielding a control range P which it will be seen is equivalent to a phase change of substantially 270° and is therefore adequate to produce phase synchronism of the two sets of horizontal pulses H and H′ under a wide variety of operating conditions.

Component values suitable for use in the circuit described above in relation to FIGURE 2 are as follows:

| | | |
|---|---|---|
| Transistors: | | |
| 26, 27 | | 2 SA17 |
| 41, 42 | | 2 SA17 |
| Diodes: | | |
| 39 | | OA72 |
| 56, 57 | | OA72 |
| Capacitors: | | |
| 36 | pf | 250 |
| 37 | pf | 5000 |
| 38 | pf | 100 |
| 51 | pf | 250 |
| 52 | pf | 5000 |
| 53 | pf | 100 |
| 54 | pf | 250 |
| Resistors: | | |
| 28 | kilohms | 10 |
| 29, 31 | do | 1 |
| 32 | do | 33 |
| 34 | do | 270 |
| 35 | do | 18 |
| 43 | do | 10 |
| 44, 45 | do | 1 |
| 46 | do | 33 |
| 47 | do | 270 |
| 48 | do | 18 |

While the invention has been illustrated and described as embodied in an apparatus for synchronizing a television signal source situated at a remote position with a master pulse generator at a central position it is not intended to be limited to the details shown, since various modifications and structural changes may be made without departing in any way from the spirit of the present invention.

What is claimed as new and desired to be secured by Letters Patent is:

1. Apparatus for synchronizing a television picture signal source situated at a remote position with sync signals generated at a central position comprising, in combination, a central sync pulse generating equipment generating a train of central horizontal sync pulses by means of a master pulse generator operating at an exactly predetermined frequency; a reference signal generator generating a periodical reference signal indicating the phase of said central horizontal sync pulses; a phase shifting device shifting the phase of a signal applied to its first input in dependence upon a control voltage applied to its second input; connection means applying said reference signal to said first input of said phase shifting device; a remote sync pulse generating equipment generating a train of remote horizontal sync pulses and synchronizing said picture signal source; means for transmitting said reference signal via said phase shifter to said remote position; means for synchronizing said remote sync pulse generating equipment with said reference signal; a phase discriminator having two inputs and one output and generating a control voltage depending upon the phase difference of signals applied to its two inputs; means applying said remote horizontal sync pulses to one of said inputs of said phase discriminator; means applying said central horizontal sync pulses to the other one of said inputs of said phase discriminator and connection means connecting said output of said phase discriminator to said second input of said phase shifting device.

2. Remote sync pulse generating equipment according to claim 1 comprising an auxiliary oscillator generating a signal of twice the horizontal frequency; a frequency divider; connection means applying the output of said auxiliary oscillator to the input of said frequency divider; an auxiliary phase discriminator having two inputs and one output and generating an auxiliary control voltage depending upon the phase difference of signals applied to its two inputs; connection means applying said reference signal to one of said inputs of said auxiliary phase discriminator; connection means applying the output of said frequency divider to the other one of said inputs of said auxiliary phase discriminator; connection means applying said auxiliary control voltage of said auxiliary phase discriminator to said auxiliary oscillator whereby the phase of said signal generated by said auxiliary oscillator is locked to the phase of said reference signal.

3. Apparatus according to claim 1 comprising a manually adjustable phase shifting device; connection means applying said reference signal via said phase shifting device and said manually adjustable phase shifting device to said remote position.

4. Phase shifting device according to claim 1 comprising two or more monostable multivibrators connected in cascade and generating a train of rectangular reference signals; connection means applying said reference signal to the input of the first one of said monostable multivibrators; connection means applying said control voltage of said phase discriminator to said monostable multivibrators in order to vary the duration of said rectangular reference signals; connection means applying said train of rectangular reference signals to said remote position.

5. Apparatus according to claim 1 comprising a further frequency divider; connection means applying said central horizontal sync pulses from said central sync pulse generating equipment to said further frequency divider; a sine generator generating sinusoidal reference signal whenever a pulse arrives at its input; connection means applying the output pulses of said further frequency divider via said phase shifting device to the input of said sine generator; and connection means applying said sinusoidal reference signal to said remote position.

6. Apparatus according to claim 1 with a central sync pulse generating equipment generating trains of central horizontal sync pulses and of central vertical sync pulses and with a remote sync pulse generating equipment generating trains of remote horizontal sync pulses and of remote vertical sync pulses comprising, in combination, a controllable switch connecting during a first operating condition a first input lead to its output lead and during a second operating condition a second input lead to its output lead; a further reference signal generator generating a further reference signal of high frequency stability the frequency of which differs from said reference signal; connection means applying said reference signal to said first input of said switch; connection means applying the output of said further reference signal generator to said second input of said switch; connection means connecting the output of said switch to said remote position; a coincidence circuit having a first and a second input for said central vertical sync pulses and said remote vertical sync pulses respectively and generating a coincidence signal effecting said first operating condition when said central vertical sync pulses and said remote vertical sync pulses coincide and effecting said second operating condition when said central vertical sync pulses and said remote vertical sync pulses don't coincide.

References Cited by the Examiner

UNITED STATES PATENTS

| | | | |
|---|---|---|---|
| 2,278,788 | 4/1942 | Knick | 178—69.5 |
| 3,184,545 | 5/1965 | Legler | 178—69.5 |

DAVID G. REDINBAUGH, *Primary Examiner.*

J. McHUGH, R. L. RICHARDSON, *Assistant Examiners.*